(12) United States Patent
Dillmann et al.

(10) Patent No.: US 7,565,823 B2
(45) Date of Patent: Jul. 28, 2009

(54) FRICTIONAL DAMPER ESPECIALLY FOR CYLINDER WASHING MACHINES

(75) Inventors: Gerold Dillmann, Wangen (DE); Kurt Wallerstorfer, Strasswalchen (AT); Ba Loc Nguyen, Neukirch (DE)

(73) Assignee: AWECO Appliance Systems GmbH & Co. KG, Neukirch (DE)

( * ) Notice: Subject to any disclaimer, the term of this patent is extended or adjusted under 35 U.S.C. 154(b) by 653 days.

(21) Appl. No.: 10/563,946

(22) PCT Filed: Jul. 9, 2004

(86) PCT No.: PCT/DE2004/001503

§ 371 (c)(1),
(2), (4) Date: Apr. 10, 2006

(87) PCT Pub. No.: WO2005/007964

PCT Pub. Date: Jan. 27, 2005

(65) Prior Publication Data

US 2007/0017260 A1    Jan. 25, 2007

(30) Foreign Application Priority Data

Jul. 10, 2003   (DE) ............................... 103 31 403

(51) Int. Cl.
*D06F 37/22* (2006.01)
(52) U.S. Cl. .................. 68/24; 68/58; 68/140
(58) Field of Classification Search ................ 134/184, 134/198; 68/24, 58, 140
See application file for complete search history.

(56) References Cited

U.S. PATENT DOCUMENTS

| | | | | |
|---|---|---|---|---|
| 2,715,952 A | * | 8/1955 | Barnett | 188/129 |
| 2,912,069 A | * | 11/1959 | Dillenburger | 188/282.5 |
| 3,251,591 A | * | 5/1966 | McNally | 267/211 |
| 4,185,574 A | * | 1/1980 | Totino et al. | 112/225 |
| 4,792,127 A | * | 12/1988 | Körtgen | 267/64.15 |

(Continued)

FOREIGN PATENT DOCUMENTS

DE    28 20 651    11/1979

(Continued)

OTHER PUBLICATIONS

European Patent Office 0 544 633 Jun. 1993.*

(Continued)

*Primary Examiner*—Frankie L Stinson
(74) *Attorney, Agent, or Firm*—Breneman & Georges

(57) ABSTRACT

The present invention relates to a frictional damper, especially for cylinder washing machines with spin cycle, having a housing (2) and a movable plunger (4) which is arranged in the housing (2) parallel to the housing longitudinal axis, is led out of the housing (2) and is provided with at least one window (6) at its end located in the housing (2), at least one mounting part (7), movable longitudinally relative to the plunger (4), for mounting a friction lining (8, 9) and at least one amplitude-dependent impact element (15, 16) for braking the movement of the mounting part (7) being provided in the window (6), this frictional damper being characterized in that the impact element (15, 16) is arranged between an inner surface (20, 21) of the window (6) and an outer surface (18, 19) of the mounting part (7).

18 Claims, 3 Drawing Sheets

U.S. PATENT DOCUMENTS

Figure 4:
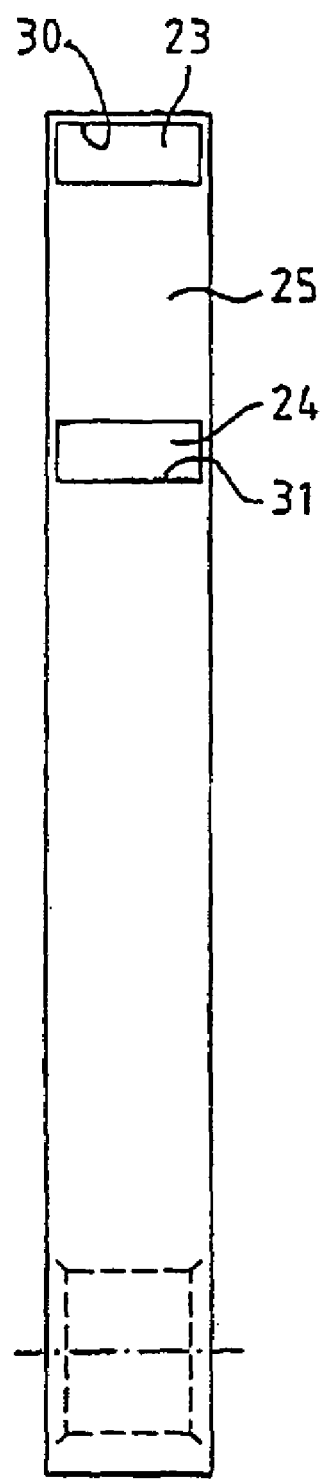

| | | | |
|---|---|---|---|
| 5,104,098 A * | 4/1992 | Kaneko | 267/64.11 |
| 5,549,182 A * | 8/1996 | Ehrnsberger et al. | 188/129 |
| 5,961,105 A * | 10/1999 | Ehrnsberger et al. | 267/216 |
| 6,367,601 B1 * | 4/2002 | Ferlicca | 188/381 |
| 6,494,300 B1 * | 12/2002 | Ferlicca | 188/129 |
| 6,955,248 B2 * | 10/2005 | Park et al. | 188/267 |
| 7,201,260 B2 * | 4/2007 | Diederich et al. | 188/322.15 |
| 7,204,104 B2 * | 4/2007 | Kim et al. | 68/23.1 |
| 2004/0148980 A1 * | 8/2004 | Kim et al. | 68/23 R |
| 2004/0231372 A1 * | 11/2004 | Kim et al. | 68/23.1 |

FOREIGN PATENT DOCUMENTS

| | | | |
|---|---|---|---|
| DE | 142 991 | | 7/1980 |
| DE | 32 16 152 A1 | | 12/1982 |
| DE | 35 13 838 A1 | | 10/1986 |
| DE | 37 25 100 A1 | | 2/1989 |
| DE | 39 08 191 A1 | | 9/1990 |
| DE | 10 14 166 A1 | | 11/1991 |
| DE | 297 20 092 U1 | | 3/1998 |
| EP | 0 407 755 A1 | | 6/1990 |
| FR | 2 322 303 | * | 3/1997 |
| JP | 04-371194 | * | 12/1992 |
| JP | 2003-159494 | * | 6/2003 |
| SU | 1397641 | * | 5/1988 |
| WO | WO 2005/007964 A1 | | 1/2005 |

OTHER PUBLICATIONS

WIPO WO/ 98/26194 Jun. 1998.*

* cited by examiner

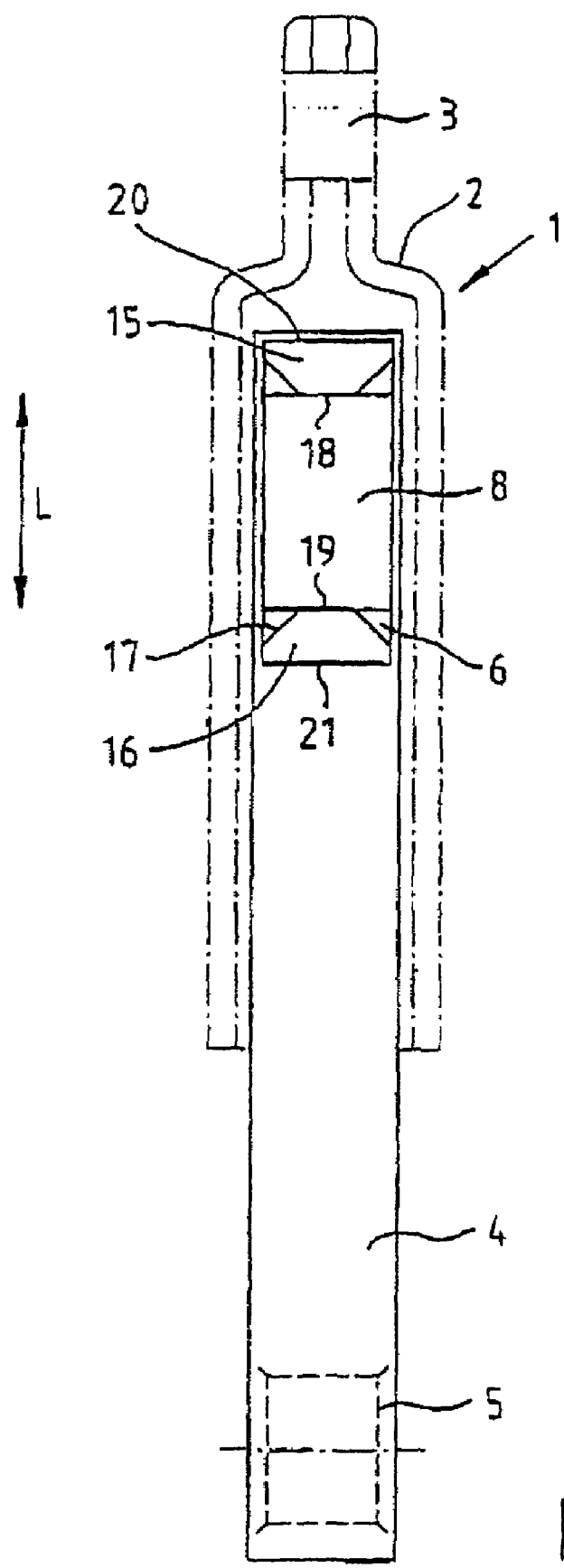
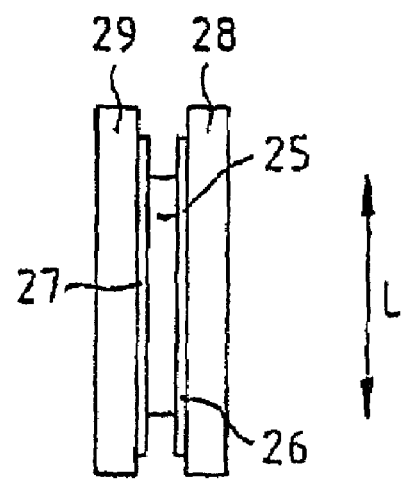
Fig. 1
Fig. 5

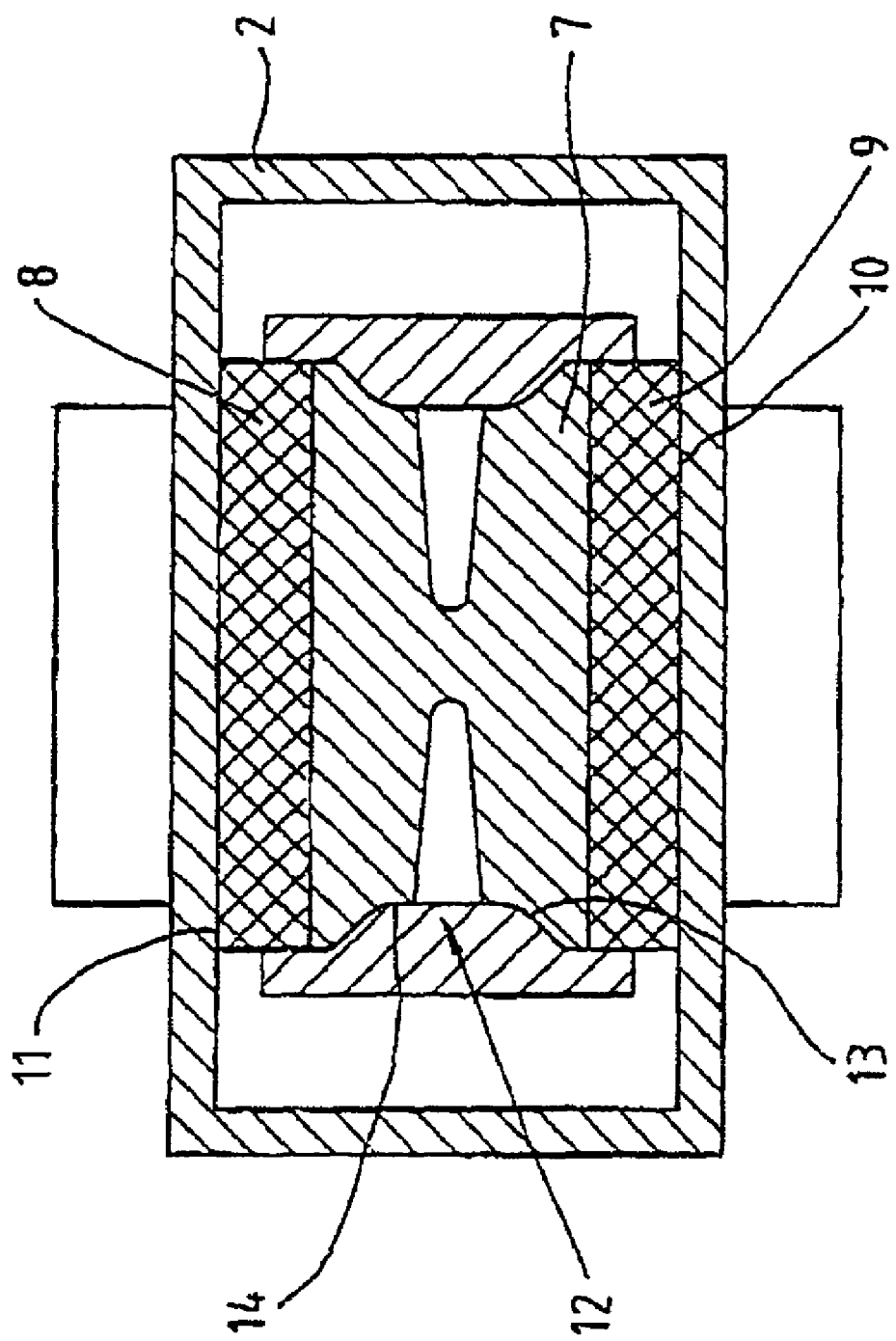

FRICTIONAL DAMPER ESPECIALLY FOR CYLINDER WASHING MACHINES

CROSS REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION (1) Field of the Invention

The invention relates to a frictional damper, especially for cylinder washing machines with a spin cycle, having a housing and movable plunger which is arranged in the housing parallel to the housing longitudinal axis that is led out of the housing and has at least one mounting part moveable longitudinally relative to the plunger for mounting a friction lining and at least one amplitude-dependent impact element for braking the movement of the mounting part provided by the window. More particularly the invention pertains to an impact element disposed between an inner surface of the window and an outer surface of the mounting part.

(2) Description of Related Art Including Information Disclosed Under 37 C.F.R. 1.97 and 1.98

European publication EP 407 755 has already disclosed a frictional damper which has a piston rod coaxially guided in a cylindrical housing and also a sleeve with friction linings which is located at its end in the housing and which is displaceable axially with respect to the piston rod against a spring or damping element. The springs are mounted between separate stops. The spacer sleeve with friction linings is accordingly not carried along by the piston rod until after a certain amplitude or stroke of the piston rod in the housing. The two-stage dependency realized in this way of the cushioning or damping on the amplitude is linear or proportional in the region of the springs and constant in the region of the friction linings. This arrangement is of cylindrical construction, so that spacer sleeve, friction linings and damping elements must have a corresponding geometry. In addition, these components are guided internally, so that they are to be pushed onto the piston rod in the axial direction and fixed in a corresponding sequence.

In addition, publication DE 28 20 651 has already disclosed a rectangular frictional damper, the plunger having a window for accommodating a slide which is longitudinally displaceable relative to the plunger and the housing. Friction linings are fixed to the slide. Mounted in the interior of the slide are helical springs which produce a linear dependency of the braking force of the slide on the amplitude. The springs consequently bear against a stop in the interior of the slide on the one hand and run against a separate holding lug having a guide pin on the other hand.

BRIEF SUMMARY OF THE INVENTION

A disadvantage with the prior art is firstly the numerous different and partly very complex parts and also the complicated assembly of the damper, a factor which gives rise to corresponding production costs.

Against this background, the object of the invention is to provide a frictional damper having an aperture or window of the plunger for accommodating a longitudinally displaceable slide which can be produced with little outlay and thus cost-effectively.

Based on a frictional damper of the type mentioned at the beginning, this object is achieved by having an impact element arranged between an inner surface of a window and an outer surface of a mounting part. Advantageous embodiments and developments of the invention are possible by orienting the inner surface of the window and the outer surface part transversely to the housing longitudinal axis, having the inner surface of the window and/or outer surface of the mounting part correspond to the cross sectional area of the mounting part, arranging the friction lining and the impact element in at least a partly overlapping manner transversely to the housing longitudinal axis, having an impact item that extends over the entire amplitude, having the dependency of the impact element depend disproportionately and constant on the amplitude, having the geometrical form of the impact element adapted to depend on the desired amplitude, having the impact element with at least one region that narrows in the direction of the housing longitudinal axis, having the impact element of a trapezoidal or triangular shape, having approximately planar friction surfaces in the housing, having an amplitude dependent impact element made for an elastomer and/or foamed plastic and/or a rubber material, having a friction lining made of an amplitude-dependent impact element, having at least two friction linings disposed on opposite sides of a plunger, having a mounting part for the guidance of a plunger with at least one guide surface in the peripherical direction and transverse to the housing longitudinal axis between two friction linings, providing a clearance between the guide surface of the mounting part and a guide surface of the plunger, having a plurality of impact elements arranged next to one another transversely to the housing longitudinal axis and having a cylinder fastened in the chassis with a frictional damper.

Accordingly, the frictional damper according to the invention is characterized by the fact that the impact element is arranged between and/or on an inner surface of the window and an outer surface of the mounting part. With this measure, the impact element or the spring and/or the damper are/is mounted directly or indirectly both on the mounting part or slide and directly or indirectly on the plunger. Advantageous covering or coating of the mounting part and/or of the plunger can readily be provided within the scope of the invention. According to the invention, separate, specially designed stop elements, as are essential to the function in the abovementioned prior art, are not necessary or are not present. Accordingly, the number of parts and also the assembly effort involved for producing the frictional damper according to the invention are reduced. According to the invention, an especially favorable frictional damper can be produced.

The housing is advantageously designed as a largely closed housing with an assembly opening for inserting the plunger. This simplifies the production of the housing. For example, the housing preferably has two doubled-up metal sheets, one metal sheet having a U-shaped design with respect to the cross section in the region for the plunger, and one metal sheet having a design to be inserted into the open U. The housing preferably comprises a fixing section for fixing the frictional damper to a machine housing or to a chassis of a washing machine or the like. The plunger comprises a second, corresponding fixing section of the frictional damper.

The frictional damper can be fixed to corresponding housings or the like, inter alia, by means of a bolt, rivet, pin, nail, screw or the like, which is encased with a damping element, such as an elastomer for example. For example, the elastomer has latching lugs or the like which ensure fixing to the fixing section of the housing and/or the plunger.

The mounting part, which can be guided, for example, in a sliding guide on the plunger or on the piston rod, enables, for example, a stop to be formed as support for the amplitude-dependent impact element. In particular, it is possible in this case to provide such a stop at the end faces on the mounting part. Such an arrangement facilitates the application of pressure to the corresponding impact element.

The inner surface of the window and/or the outer surface of the mounting part are/is preferably oriented essentially transversely, in particular virtually perpendicularly, to the housing longitudinal axis. The inner surface of the window and/or the outer surface of the mounting part are/is advantageously of largely planar design. Each of these advantageous variants ensure that the frictional damper or the assembly of the components is realized in an especially simple manner.

In a special development of the invention, the plunger and/or the mounting part and/or the impact element are/is designed in such a way that lateral assembly of all components, i.e. assembly directed transversely to the housing longitudinal axis, can be realized. A lateral guide or guide surface formed on the periphery of the mounting part is preferably provided. At least two guide surfaces which are essentially opposite one another or are provided on sides of the mounting part arranged opposite one another are advantageously provided for guidance on the plunger. In this way, advantageous external guidance of the mounting part or the slide can be realized. This in turn permits especially simple fitting of the mounting part.

In an advantageous embodiment of the invention, the inner surface of the window and/or the outer surface of the mounting part corresponds to at least 80% or 90% of the cross-sectional area of the mounting part and preferably corresponds essentially to the cross-sectional area of the mounting part. As a result, relatively large surfaces or stops can be realized, so that the surface pressure and thus corresponding stresses, in particular bending stresses, are advantageously reduced. According to the invention, an especially robust construction having a long service life can be realized.

A comparatively thin bridge region of the plunger has the inner surface of the window according to the invention. The bridge region or stop is advantageously arranged or fixed between pulling sections of the plunger which are stressed in tension. The two pulling sections advantageously comprise guide surfaces for guiding the mounting part. The guide surfaces of the plunger are preferably sections of inner surfaces of the plunger which are oriented in the axial direction.

For example, an axially oriented integrally formed portion or a strip or the like comprises the guide surfaces of the plunger. The guide surfaces of the mounting part are preferably provided in a recess or groove or the like.

If need be, the friction lining and impact element may be arranged next to one another or offset from one another transversely to the housing longitudinal axis or in the radial direction. The friction lining and the impact element are advantageously arranged in an at least partly overlapping manner, in particular in an essentially completely overlapping manner, transversely to the housing longitudinal axis. For example, friction lining and impact element are arranged next to one another or adjacent to one another in the axial direction. In this way, an especially narrow frictional damper can be realized. In addition, correspondingly arranged friction linings or mounting parts, impact elements, etc., can be fitted from one side, which additionally reduces the assembly effort involved and thus the production costs.

In a preferred variant of the invention, a wall of the mounting part is provided at least in the axial direction between the friction lining and the impact element. The wall comprises in particular the outer surface according to the invention at which the impact element is advantageously disposed. The outer surface and/or the wall preferably have/has an end face and/or a narrow side of the mounting part. For example, the wall projects slightly radially, so that especially simple, in particular positive-locking fixing of the friction lining can be realized on the mounting part in the axial direction. The wall is preferably designed as a stop for fixing the friction lining.

An impact element extending at least over 80% or 90% of the amplitude, in particular extending essentially over the entire amplitude, is advantageously provided. With this measure, the dependency of braking or damping on the amplitude can be controlled or set in an especially advantageous manner. In this case, the impact element or the counterforces generated by the impact element can be flexibly adapted to many different uses or to many different cylinder washing machines, in particular of various manufacturers. For example, frictional dampers of virtually identical construction with widely differing spring/damping characteristics can be realized by a wide variety of impact elements according to the invention being used. For example, depending on the application, impact elements may be provided with different materials, material compositions, degrees of porosity, etc., and/or with different geometrical forms or profiles.

The impact element is preferably designed in such a way that the dependency of the impact element on the amplitude is disproportionate and constant. It has been found that a correspondingly realized impact element produces especially advantageous properties of the frictional damper. For example, at the start of the deflection of the mounting part, it is possible to provide virtually no braking or damping and/or in particular largely friction-free guidance, so that a free stroke of the mounting part is realized. Within the range of the free stroke, the plunger or the housing, that also means, for example, the cylinder of the washing machine, can freely vibrate to the greatest possible extent.

For example, the impact element is designed as a spring element having virtually no damping effect or only a very small damping effect, so that the braking can be realized with only a little generation of heat or largely without the generation heat. Consequently, the frictional damper according to the invention is only slightly heated during operation, in particular during the vibration with deflections which are effected within the free stroke and/or within the deflection capacity of the mounting part. Heat energy is produced in a relevant manner according to the invention only during deflections of the plunger relative to the housing which cause an adjustment of the friction lining relative to the housing.

Furthermore, the cushioning or braking characteristic can be set as a function of stroke/displacement by appropriate design of the amplitude-dependent impact elements. The impact element preferably has different zones for producing the desired dependency on the amplitude. For example, this is realized with different materials or material structures or the like.

The geometrical form of the impact element is preferably adapted to the desired dependency on the amplitude. For example, desired force/displacement characteristics can be set by corresponding profiled portions or the like of the deformable elements. For example, profiled portions may be provided in and/or transversely to the direction of the housing longitudinal axis.

The impact element preferably has at least one region narrowing in the direction of the housing longitudinal axis. A disproportionate and constant characteristic of the amplitude dependency of the impact element can thereby be realized in an especially elegant manner. For example, the narrowing region is designed as a circular segment section.

In an advantageous embodiment of the invention, the region of the impact element has a trapezoidal shape or a triangular shape. Corresponding shapes can be produced in an especially simple manner.

In a special development of the invention, at least the amplitude-dependent impact element is made essentially of an elastomer and/or of a foamed plastic and/or of a rubber material. In this way, corresponding impact elements having different shapes or having, for example, the abovementioned advantageous shapes can be produced in an especially simple manner on the one hand and can be fitted very easily on the other hand, so that assembly can be simplified and the costs for a frictional damper can be further reduced.

In an advantageous variant of the invention, the mounting part, for guidance on the plunger, has at least one guide surface in the peripheral direction and transversely to the housing longitudinal axis between two friction linings. In this way, especially simple and external guidance of the mounting part or of the slide can be realized. At least two guide surfaces arranged on opposite sides of the mounting part are preferably provided for the guidance of the mounting part. In this case, the guide can merely be designed as two stops which are oriented in the housing longitudinal axis and between which the mounting part is mounted.

For example, the guide comprises a tongue-and-groove unit oriented in the axial direction. The mounting part preferably has the groove and the plunger preferably has the tongue, so that the corresponding plunger section is advantageously reinforced, which improves the stability or enables the plunger section to otherwise be of comparatively thin design. In this way, advantageous dimensioning of the plunger and/or of the mounting part can be realized.

Clearance is advantageously provided between the guide surface of the mounting part and a guide surface of the plunger. The clearance according to the invention ensures especially low-friction sliding guidance of the mounting part on the plunger. For example, the guide surfaces are lubricated, so that there is virtually no friction. As a result, generation of heat on account of the guidance can be effectively minimized.

In a preferred configuration of the invention, at least two opposite friction linings and two opposite guide surfaces of the mounting part are provided, the guide surfaces being arranged transversely to the housing longitudinal axis and, as viewed in the peripheral direction, in each case between the friction linings and/or transversely to the friction linings. In this way, the (clamping) forces produced by the friction linings and the corresponding forces of the guides are advantageously isolated, so that the guide forces can be advantageously minimized, for example by means of clearance, lubricant or the like.

In a special variant of the invention, a plurality of impact elements arranged next to one another transversely to the housing longitudinal axis are provided. For example, these impact elements have widely differing shapes, degrees of porosity and/or materials, so that the braking can be set in an advantageous manner.

In a special development of the invention, the friction lining or the friction linings is/are produced from a flat material, which is possible, for example, by simple stamping or cutting. In this way, the friction linings can be produced in a considerably simpler manner.

In a preferred embodiment, the housing has a polygonal, preferably rectangular, cross section at least in the region of the friction linings. At least approximately planar friction surfaces are preferably provided in the housing. For example, the friction linings produced from flat material can be advantageously attached to the friction surfaces without deformations or with only insignificant deformations.

The at least one amplitude-dependent impact element, also referred to below alternatively as damping element, is preferably produced at least partly from flat material, which further simplifies the production of the frictional damper. If need be, given corresponding cushioning/damping properties, the same material as for the impact element or elements may be used for the friction lining or linings.

In another embodiment, the friction linings are designed in such a way that they comprise the amplitude-dependent impact element(s). The number of requisite components is reduced as a result.

The amplitude-dependent impact elements preferably comprise a material which is at least deformable in the axial direction with respect to the assembled state. This may be brought about, for example, by means of an elastomer, a rubber material or a foamed plastic, e.g. with open or closed pores, the material being advantageously selected in such a way that it has very good spring damping and, for example, inherent damping during the recovery.

At least one end region of at least one friction lining is preferably designed as an amplitude-dependent impact element. This may be effected by the friction lining comprising a correspondingly deformable material at least in the end region. The amplitude-dependent braking effect is then obtained during the compression of the friction lining when running onto a corresponding stop fixed with respect to the piston rod or onto the inner surface of the plunger.

As already stated above, a friction lining according to the invention is preferably designed in such a way that there are at least two friction linings. This increases the friction in a compact design and also permits a systematic construction with the associated advantages with regard to the forces occurring in operation.

These friction linings are preferably arranged on two opposite sides of the plunger or of the piston rod or of the housing of the frictional damper. Such an arrangement has the advantage that the forces which are produced by the clamping of the friction lining between housing and piston rod or, depending on the embodiment, the mounting element for the friction lining are equalized, so that additional supports of the mounting of the friction lining are not necessary.

The arrangement with two opposite friction linings using flat material is especially advantageous in a frictional damper having a rectangular or square cross section. In general, it is advantageous to adapt the shape of the friction linings to the inner contour of the damper housing, since this enables the inner surface of the housing to be used directly as friction surface.

BRIEF DESCRIPTION OF THE SEVERAL VIEWS OF THE DRAWING(S)

Figure 3:
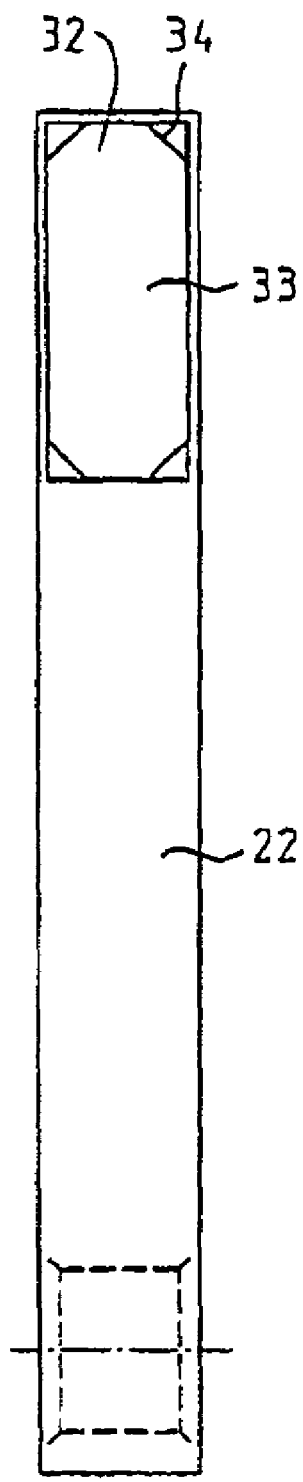

An exemplary embodiment is shown in the drawing and is explained in more detail below with reference to the figures.
In the drawing, in detail:

FIG. 1 shows a schematic plan view of a piston rod according to the invention,

FIG. 2 shows a cross section through a piston rod according to FIG. 1 in the region of the friction linings, FIG. 3 shows a plan view of a further embodiment of a piston rod according to the invention with friction linings, FIG. 4 shows an illustration corresponding to FIG. 3 without friction linings, and FIG. 5 shows a cutaway longitudinal section through a piston rod according to FIG. 3 in the region of the friction linings.

DETAILED DESCRIPTION OF THE INVENTION INCLUDING BEST MODE

The frictional damper 1 according to FIG. 1 comprises a housing 2, on which a fastening lug 3 is provided.

Guided in the housing 2 is a plunger 4, which likewise has a fastening lug 5 on the end opposite the fastening lug 3. The fastening lugs 3, 5 serve for fastening or fixing, for example, to a chassis of a cylinder washing machine on the one hand and to the washing cylinder on the other hand.

At its end located in the housing 2, the plunger 4 is provided with a rectangular window or aperture 6. A slide or mounting part 7 (cf. FIG. 2) is mounted in this aperture 6 longitudinally, i.e. in such a way as to be displaceable in the direction of the double arrow L. The mounting part 7 carries two friction linings 8, 9 on both sides, which adjoin the corresponding friction surface 10, 11 with a friction grip at the set tension.

As can be seen with reference to FIG. 2, a linear guide 12 is provided in the form of a groove 13 made in the mounting part 7 and a corresponding projection 14 provided in the mounting part 7.

The aperture 6 is longer than the mounting part 7, so that there is space at the end faces for a displacement-dependent or amplitude-dependent impact element 15, 16, respectively. In the present embodiment, the impact or spring/damping elements 15, 16 are provided with bevels 17, so that this results in a corresponding stroke- or displacement-dependent counterforce. The resistance of the impact elements 15, 16 increases disproportionately with the retraction due to the geometrical form shown.

At this location, other geometries for corresponding characteristics between stroke force and counterforce are also possible.

During the extension or retraction of the plunger 4 from or into the housing 2, the frictional damper 1 first of all permits a displacement of the plunger 4 without carrying along the mounting part 7 having the friction linings 8. In the process, the corresponding impact element 15, 16 is in each case compressed between the corresponding end face 18, 19 of the mounting element 7 and the associated stop 20, 21. The greater the impact element 15, 16 is compressed, the greater becomes the resulting counterforce, it being possible to additionally predetermine the force/displacement characteristic by the geometry of the impact elements 15, 16.

If a sufficient counterforce is exceeded, the mounting element 7 is pulled along or pushed, in the course of which the friction linings 8, 9 develop their damping effect on the corresponding friction surface 10, 11 of the housing 2.

The embodiments according to FIGS. 3, 4 and 5 show how the impact elements can be integrated in the friction linings.

The plunger 22 has two recesses 23, 24 at its end projecting into the housing 2. In addition, it is designed as a flat plate 25 in the region of the friction linings, this flat plate 25 having sliding surfaces 26, 27 on both sides. On both sides of the flat plate 25, friction linings 28, 29 are put onto the sliding surfaces 26, 27.

In this embodiment, the two inner surfaces 30, 31 of the recesses 23, 24 which are the furthest distance apart in longitudinal direction L serve as a stop for the impact elements 32, 33 integrated in the friction linings 28, 29. The impact elements 32, 33 result from the length of the friction linings 28, 29, which are selected to be so large that the end faces of the friction linings 28, 29 end at the level of the inner surfaces 30, 31. Due to the preliminary pressure which is produced by the insertion of the plunger with friction linings 28, 29 into the housing (not shown in FIGS. 3, 4 and 5), the end regions of the friction linings, i.e. the impact elements 32, 33, bend so far inward that they strike against the inner surfaces 30, 31 at the end faces.

The force/displacement characteristic of the impact elements 32, 33 is again predetermined by bevels 34. In this embodiment, too, other shapes for further desired force/displacement characteristics are conceivable.

A pull or push on the plunger 22 inside the housing 2 first of all results in a deformation of the friction linings 28, 29 in particular in their end regions, which thus form the impact elements 32, 33. In this case, a relative movement between plunger 22 and friction linings 28, 29 is possible on account of the sliding surfaces 26, 27 provided.

It is not until a corresponding counterforce produced by deformation of the impact elements 32, 33 is exceeded that the friction linings 28, 29 are carried along and displaced as a unit relative to the housing 2 (not shown in any more detail). As soon as the displacement starts, the normal friction damping results on account of the friction of the friction linings 28, 29 on the corresponding friction surface of the housing 2, in the simplest case on the inner wall of the housing 2.

This embodiment is also especially suitable for a frictional damper having a square or rectangular cross section or having two essentially parallel friction surfaces opposite one another.

The construction of this second exemplary embodiment is again simplified compared with the first exemplary embodiment, since here, for assembly, the friction linings 28, 29 merely have to be put onto the corresponding plunger 22 and inserted together with the latter into an associated housing 2.

The friction linings and/or the impact elements can easily be produced in both embodiments by preparing a corresponding flat material. In the last-mentioned embodiment, the impact elements 32, 33 are completed at the same time as the friction linings 28, 29 are prepared.

In the first embodiment according to FIGS. 1 and 2, the impact elements 15, 16 may in principle likewise be produced from the same flat material as the friction linings, in which case, depending on the geometry, the corresponding flat material may be laid in a laminar manner in a superimposed or contiguous relationship in the transverse or longitudinal direction.

The exemplary embodiments shown illustrate just two different variants for a frictional damper according to the invention.

LIST OF DESIGNATIONS

1 Frictional damper
2 Housing
3 Fastening lug
4 Plunger
5 Fastening lug
6 Aperture
7 Mounting part 8 Friction lining
9 Friction lining
10 Friction surface
11 Friction surface
12 Linear guide
13 Groove
14 Projection
15 Impact element
16 Impact element
17 Bevel
18 End face
19 End face
20 Stop
21 Stop
22 Plunger
23 Recess
24 Recess
25 Plate
26 Sliding surface
27 Sliding surface
28 Friction lining
29 Friction lining
30 Inner surface
31 Inner surface
32 Impact element
33 Impact element
34 Bevel

What is claimed is:

1. A cylinder washing machine frictional damper having a housing (2) and a movable plunger (4) which is arranged in the housing (2) parallel to the housing longitudinal axis which projects out of the housing (2) wherein the improvement comprises a frictional damper having a window (6) and at least one mounting part (7), movable longitudinally relative to the moveable plunger (4), for mounting at least one amplitude-dependent impact element (15, 16, 32, 33) having a friction lining (8,9) for braking the movement of the mounting part (7) provided in the window (6), wherein the at least one amplitude-dependent impact element (15, 16, 32, 33) is arranged between an inner surface (20, 21) of the window (6) and an outer surface (18, 19) of the mounting part (7).

2. The frictional damper as claimed in claim 1 wherein an inner surface (20, 21) of the window (6) and an outer surface (18, 19) of the mounting part (7) are oriented essentially transversely to the housing longitudinal axis.

3. The frictional damper as claimed in claim 1 or 2 wherein a inner surface (20, 21) of the window (6) and/or an outer surface (18, 19) of the mounting part (7) corresponds essentially to the cross-sectional area of the mounting part (7).

4. The frictional damper as claimed in claim 1 wherein the friction lining (8, 9, 28, 29) and the impact element (15, 16, 32, 33) are arranged in an at least partly a overlapping manner transversely to the housing longitudinal axis.

5. The frictional damper as claimed in claim 1 wherein the impact element (15, 16, 32, 33) substantially extends over the entire amplitude.

6. The frictional damper as claimed claim 1 wherein the dependency of the impact element (15, 16, 32, 33) on the amplitude is disproportionate and constant.

7. The frictional damper as claimed in claim 1 wherein the geometrical form of the impact element (15, 16, 32, 33) is adapted to the desired dependency on the amplitude.

8. The frictional damper as claimed in claim 1 wherein the impact element (15, 16, 32, 33) has at least one region (17, 34) narrowing in the direction of the housing longitudinal axis.

9. The frictional damper as claimed in claim 1 wherein a region (17, 34) of the impact element (15, 16, 32, 33) has a trapezoidal shape or a triangular shape.

10. The frictional damper as claimed in claim 1 wherein at least approximately planar friction surfaces (10, 11) are provided in the housing (2).

11. The frictional damper as claimed in claim 1 wherein the at least one amplitude-dependent impact element (15, 16, 32, 33) is made essentially of an elastomer or of a foamed plastic and/or of a rubber material.

12. The frictional damper as claimed in claim 1 wherein the friction lining (33) forms the amplitude-dependent impact element (32, 33).

13. The friction damper as claimed in claim 12 wherein at least two friction linings (8, 9, 28, 29) are arranged on opposite sides of the plunger (4).

14. The friction damper as claimed in claim 13 wherein the mounting part (7), for guidance on the plunger (4), has at least one guide surface (12) in the peripheral direction and transversely to the housing longitudinal axis between at least two friction linings (8, 9, 28, 29).

15. The friction damper as claimed in of claim 1 wherein a clearance is provided between a guide surface (12) of the mounting part (7) and a guide surface of the plunger.

16. The frictional damper as claimed in claim 1 wherein a plurality of amplitude-dependent impact elements are arranged next to one another transversely to the housing longitudinal axis are provided.

17. A frictional damper for a cylinder washing machine comprising:
(a) a housing having a fastening lug disposed on one end;
(b) a plunger slidably disposed in said housing having a fastening lug disposed on one end;
(c) a window or aperture disposed at the other end of said plunger;
(d) a slide or mounting part disposed in said window or aperture; and
(e) at least one amplitude-dependent impact element for braking the movement of the slide or mounting part.

18. The friction damper of claim 17 further comprising two friction linings disposed on said mounting part with a friction grip.

* * * * *